US012380683B2

(12) United States Patent
Shamir

(10) Patent No.: US 12,380,683 B2
(45) Date of Patent: Aug. 5, 2025

(54) FORECASTING UNCERTAINTY IN MACHINE LEARNING MODELS

(71) Applicant: Google LLC, Mountain View, CA (US)

(72) Inventor: Gil Shamir, Sewickley, PA (US)

(73) Assignee: GOOGLE LLC, Mountain View, CA (US)

( * ) Notice: Subject to any disclaimer, the term of this patent is extended or adjusted under 35 U.S.C. 154(b) by 449 days.

(21) Appl. No.: 17/988,861

(22) Filed: Nov. 17, 2022

(65) Prior Publication Data

US 2024/0169707 A1    May 23, 2024

(51) Int. Cl.
*G06V 10/77*    (2022.01)
*G06V 10/772*   (2022.01)
*G06V 10/774*   (2022.01)
*G06V 10/82*    (2022.01)

(52) U.S. Cl.
CPC ........ *G06V 10/7747* (2022.01); *G06V 10/772* (2022.01)

(58) Field of Classification Search
USPC ........... 382/155, 159; 706/12, 15, 20, 25, 52
See application file for complete search history.

(56) References Cited

U.S. PATENT DOCUMENTS

| | | | |
|---|---|---|---|
| 11,562,203 B2 * | 1/2023 | Gauthier | G06V 10/40 |
| 11,742,076 B2 * | 8/2023 | Banerjee | G06N 3/08 |
| | | | 706/25 |
| 11,790,369 B2 * | 10/2023 | Wittenbach | G06Q 20/4016 |
| | | | 705/39 |
| 2021/0117760 A1 * | 4/2021 | Krishnan | G06N 3/08 |
| 2021/0366106 A1 * | 11/2021 | Yao | G06F 21/6254 |
| 2022/0108219 A1 * | 4/2022 | Shamir | G06N 3/045 |
| 2023/0040793 A1 * | 2/2023 | Sud | G06V 20/647 |
| 2024/0428573 A1 * | 12/2024 | Fuxman | G06V 10/82 |

* cited by examiner

*Primary Examiner* — Ishrat I Sherali
(74) *Attorney, Agent, or Firm* — DORITY & MANNING, P.A.

(57) ABSTRACT

Provided are systems and methods for generating a score for any model which can be updated online, regardless of model type architecture and parameters, leveraging relations between regret and uncertainty.

18 Claims, 4 Drawing Sheets

FORECASTING UNCERTAINTY IN MACHINE LEARNING MODELS

FIELD

The present disclosure relates generally to machine learning. More particularly, the present disclosure relates to systems and methods for generating a score to measure uncertainty for any model which can be updated online, regardless of model type architecture and parameters, leveraging relations between regret and uncertainty.

BACKGROUND

Classical techniques in machine learning generate point estimates for inference scores. In some regression problems and classification, the probability of a label is generated. However, the prediction of the label of one example can be based on ample previously seen examples like it, whereas the prediction of another can be based on very few previously seen examples. While point prediction values may give some ranking between such two examples, they do not disclose how much the model is certain about each of these predictions. If an action is decided based on the ranking, existing systems may prefer the example for which very few similar past examples have been seen, for which the prediction score may be with a much larger confidence interval, given the past examples on which the decision had been made.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method to determine an uncertainty score for a machine-learned model. The computer-implemented method can be performed for each of a plurality of examples, each example may include an input and a label. The method can include processing, by a computing system may include one or more computing devices, the input with the machine-learned model to generate a model score and a prediction with respect to the label. The method can include updating, by the computing system, one or more parameter values of the machine-learned model based on a gradient associated with the prediction of the machine-learned model with respect to the label, thereby generating an updated machine-learned model. The method can include processing, by the computing system, the input with the updated machine-learned model to generate an updated score. The method can include determining, by the computing system, a difference between the model score and the updated score. The method can include determining, by the computing system, one or both of: a measure of an effective number of similar examples that the machine-learned model observed in a training dataset based on the difference between the model score and the updated score; and/or an uncertainty score for the example based on the difference between the model score and the updated score. Other embodiments of this aspect include corresponding computer systems, apparatus, and computer programs recorded on one or more computer storage devices, each configured to perform the actions of the methods.

Implementations may include one or more of the following features. The computer-implemented method where the method further may include determining, by the computing system, an action based on the measure or the uncertainty score determined for each of the plurality of examples. The action may include an explore or exploit decision. The model used to compute the uncertainty score may be an auxiliary model to a model used to perform inference. The computed uncertainty score of effective number of similar examples is used to determine a shrinkage of the prediction. The label for each example may include a ground truth label for the input. The label for each example may include a binary label. The label for each example may include a label from a multi-label setting. The method may include determining the measure or the uncertainty score for the input relative to each of a number of possible labels and generating a weighted average of the measures or the uncertainty scores over all of the number of possible labels. The model score may include a dot product or an output of a neural network. The model score may include a logit score. The prediction may include a probability prediction for the input relative to the label. The measure may include one divided by the prediction times an absolute value of the difference between the model score and the updated score and the uncertainty score may include one minus the prediction times the prediction squared times an absolute value of the difference between the model score and the updated score. The method may include determining the measure. The method may include determining the uncertainty score. Updating, by the computing system, the one or more parameter values of the machine-learned model based on the gradient may include performing a gradient descent step. The computer-implemented method may include, for each example: reverting the updating of the one or more parameter values of the machine-learned model so as to return to the machine-learned model prior to said updating to perform inference on the score of the ground truth label of an example. The machine-learned model is updated in an online fashion.

Implementations of the described techniques may include hardware, a method or process, or computer software on a computer-accessible medium.

BRIEF DESCRIPTION OF THE DRAWINGS

Detailed discussion of embodiments directed to one of ordinary skill in the art is set forth in the specification, which makes reference to the appended figures, in which.

Figure 1:
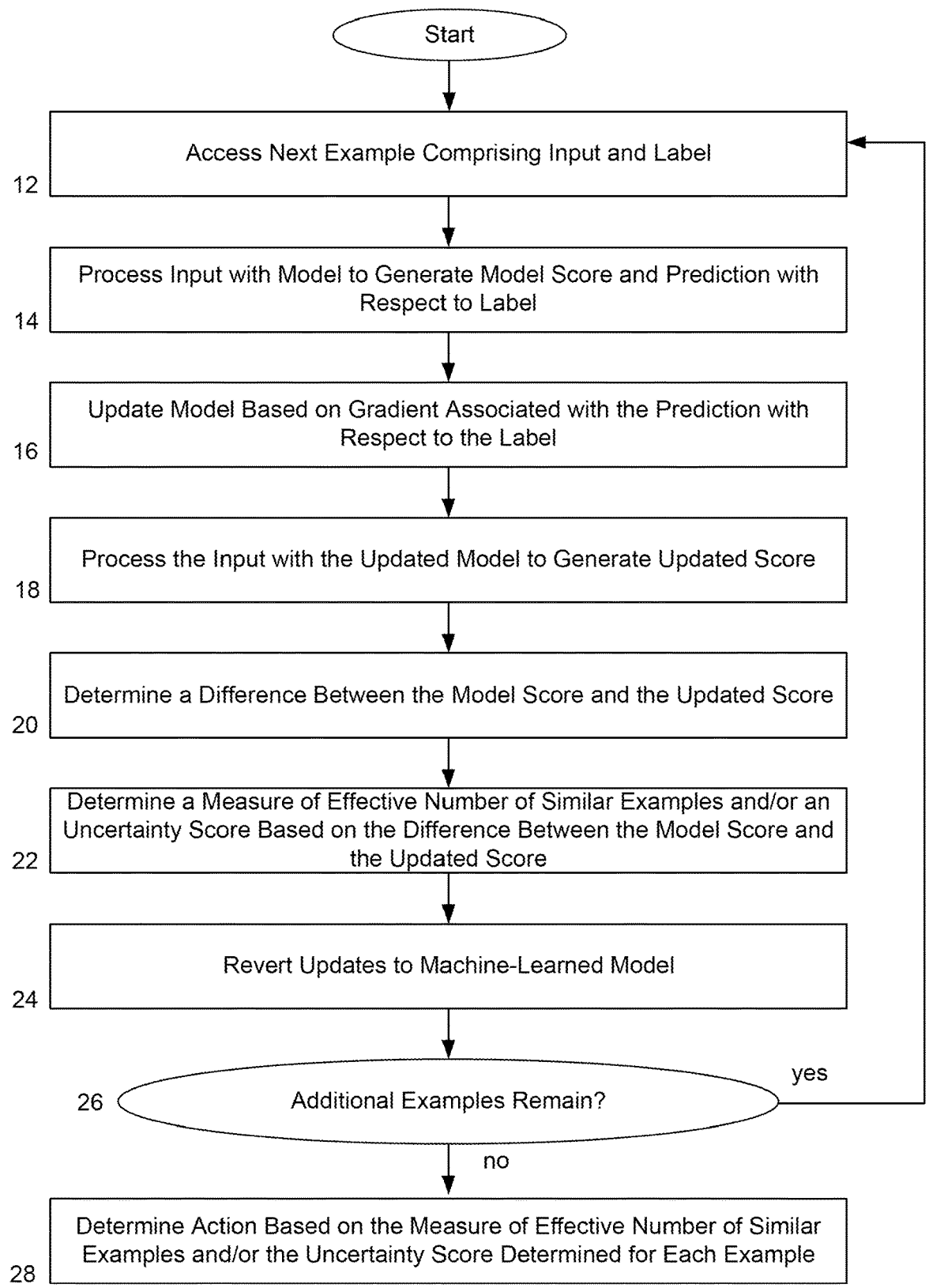
FIG. 1 depicts a flow chart diagram of an example method according to example embodiments of the present disclosure.

Reference numerals that are repeated across plural figures are intended to identify the same features in various implementations.

DETAILED DESCRIPTION

Overview

Generally, the present disclosure is directed to systems and methods for generating a score for any model which can be updated online, regardless of model type architecture and parameters, leveraging relations between regret and uncertainty. The proposed techniques can be implemented as a wrapper method on a model on top of its learning algorithm. The proposed techniques enable a computing system to generate a simple estimate of uncertainty with respect to the model that can be used to rank uncertainty of prediction over a set of examples. The method can use the current learning state of the model to generate an inference prediction on a label and can compute the update that the model would apply if that label were the true label. Then, a second inference can be applied on the same example for the same label. The difference between the inference score after and before the update can be used with bounds on a single dimensional Follow-The-Regularized-Leader (FTRL) optimal update change to compute the effective number of seen examples, n, for "similar examples" to this example. This value of n can then in turn be used to produce an uncertainty score or can be used by itself as inverse to this score. The uncertainty score can then be used by the system to dictate actions based on both the prediction and the uncertainty score. Such actions can include decisions of whether to explore or exploit, as well as downstream actions on a system level. For example, whether to use such an example to train/update the model or not.

More particularly, as introduced above, classical techniques in machine learning generate point estimates for inference scores. In some regression problems and classification, the probability of a label is generated. However, the prediction of the label of one example can be based on ample previously seen examples like it, whereas the prediction of another can be based on very few previously seen examples. While point prediction values may give some ranking between such two examples, they do not disclose how much the model is certain about each of these predictions. If an action is decided based on the ranking, existing systems may prefer the example for which very few similar past examples have been seen, for which the prediction score may be with a much larger confidence interval, given the past examples on which the decision had been made. This problem has sparked a huge amount of interest in recent years, bringing rise to various techniques that would measure the uncertainty of the prediction produced by a model.

When there is only a single parameter that is learned, the epistemic uncertainty, e.g., the uncertainty originating from the lack of knowledge of the model parameters, is a function (not only) of the number of examples that have been seen. The more examples observed, the more confident one can be of the estimate of the parameters. For example, if we have n independent flips of some unfair coin, and we want to estimate the probability; p, of a positive label, say, "heads", then, we can estimate the probability p of heads as the empirical ratio of "heads" to the total number of coin flips. The error variance of such a Bernoulli random variable estimator is given by $$\sigma^2 = \frac{p(1-p)}{n} \tag{1}$$

This variance gives a measure of the uncertainty we have in our estimator. With n large enough and the central limit theorem, this variance plays a role of the variance of a normal distribution around p, designating the probability of where we are relative to the true value of p. The greater is n, the more certain we can be of our predictions of p, although, we still have some dependency on p, which becomes significant with very small p or with values very close to 1.

In learning problems, however, especially problems in which there are multiple (e.g., billions of) features, some of which occur in one example, others in another, the problem of estimating some uncertainty score becomes much more complicated. A given example consists of multiple features, where each occurred in past training examples a different number of times, and each represents a different contribution to a probability of a positive label. Furthermore, the learning algorithm may not be optimal to the point in which it can achieve a prediction for which the best uncertainty possible can be achieved. In fact, all practical learning algorithms for such complex systems are unable to produce predictions that yield the best possible epistemic uncertainties. Furthermore, when training deep networks, we train many layers and components, each of which has its own parameters which are learned in a different rate than others.

In view of the above, aspects of the present disclosure provide techniques to generate a simple measure of uncertainty that allows a computing system to measure which of two (or more) examples on which a model produces a prediction is more certain. This measure can be applied to fit any type of model, and, in fact, can be agnostic to the actual model and learning algorithm, focusing only on the example, and giving scores on all examples observed at a given time that reliably differentiate the uncertainty of the model based on all the training data it has seen among these examples. Each model has its own sub-optimalities in training, and these can be factored into this score.

First, a few assumptions are described which are used to discuss example implementations of the proposed approach. It can be assumed that the model is not misspecified, in the sense that the features on which the model learns do give a reasonable representation of the examples of interest.

It can also be assumed that the model is converged to a state near some local (or global) optimum, such that we are not very early in training of the model, and gradient steps taken do not completely change the model, and more specifically, taking steps with lower learning rates are allowed, but if the learning rate and/or gradient updates are very low, the model had already converged to produce reasonable predictions, so the computed metric is not dictated by models that have not yet given reasonable predictions on representative examples of the true data.

For the uncertainty score ranking to be meaningful in ranking different examples, it can also be assumed that the score of interest for multiple examples is generated with an identical model for all these examples, and for any group of examples that are compared, the model does not update (or significantly) update between inferences on these examples. We can consider an online setting where the model keeps updating, but then we should account for the changes when comparing examples over multiple time units. Having established a few general assumptions, example methodology is now discussed.

The connection between Minimum Description Length, regret, and prediction uncertainty was established in a seminal paper by Rissanen. If models are properly specified, we can minimize the regret to 0.5 log n per each parameter we learn by observing n examples. Bayesian mixture approaches like the Krichevsky-Trofimov estimators are able to achieve this regret for Bernoulli sequences. This means that such estimators also yield predictors whose variance meets that of equation (1). Interestingly though, a single dimensional online Follow-The-Regularized-Leader (FTRL) with a Dirichlet-½ (Beta) prior approach is able to achieve the same regret. (Unfortunately, this is only true for the single dimensional binary case.)

Example systems and methods of the present disclosure can leverage the single dimensional relationship between prediction variance and the FTRL methodology leveraging properties of optimal single dimensional FTRL to generate bounds and even expressions of uncertainty. This can be done by completely ignoring all features, and concentrating only on the label. Example aspects of the discussion contained herein focus on the binary labels case, so the approach is described with reference, but the proposed techniques can be applied to more labels as well.

Focusing only on the label and not on the model structure, features, and architecture, provides significant complexity simplifications relative to techniques like ensembles and dropout that require multiple inferences with large complexity to compute an uncertainty score. The approach described in this document can be done with a single additional inference and a single model update.

Let $p_t$ denote the probability our model produces to some (fake) label $y_t$ we may observe at t. The prediction $p_t$ is typically a Sigmoid value of some score (or dot product) $s_t$ that the model generated for this example given all weights and all parameters. We only consider this prediction for the given example and ignore the whole process the model went through to generate this prediction. Now, consider a different problem, where there are n prior examples with a single feature on which we trained, and the example we predict on consists only of this feature. It can be shown that the update to the score of this feature's prediction of a well regularized FTRL algorithm is proportional to the gradient of the current example normalized by the cumulative Hessian over all past n examples, where the value of the Hessian is computed using the current values of the (online learned) model weight, i.e., $$|\delta| \propto \frac{|g|}{nH} = \frac{1 - p_t}{np_t(1 - p_t)} = \frac{1}{np_t} \quad (2)$$

where g is the gradient taken for the example and H is the per-example Hessian. Since we view a single dimensional problem here with a single feature, the gradient $|g|=1-p_t$, and the cumulative Hessian as it is computed with the current belief of the model is nH, where $H=p_t(1-p_t)$. This gives a relation between the change in the model's score and the probability of the label observed as well as the number of examples observed in the past, if we actually applied this update.

We can now take an agnostic view and redefine n not as the number of examples we observed in a single dimensional problem, but as the effective number of training examples for some example whose uncertainty we are trying to estimate. Now, we are no longer in a single dimensional problem, instead, we observe the model score (e.g., dot product, output of deep network, or anything else) for this example as if it were generated by a single feature. If we were to update that model for observing the label $y_t$, we would have a delta δ value on this score. So, we can apply an update of the model on one of the possible labels (say, the positive one, for example), and compute the delta value of the top level score. Using that delta value, we get from equation (2), $$n = \frac{1}{|\delta|p_t} \quad (3)$$

Note, that we can choose either of the labels, as the gradient included in delta would yield the same value for either positive or negative labels.

The value of n in equation (3) gives us, regardless of which features were used in the prediction, or anything else, an effective number of examples we had seen in the training data for the example on which we are predicting for our model. The value of delta was determined specifically for an online update of our model with whatever learning parameters update our model applies. So, the magnitude of change to the score our model will apply on an example if it were to update on the example is inversely proportional to the effective number of examples which the model has seen which are similar to the example which we are observing. Now, the model did not really observe n such examples, but effectively to the update averaging on all updates it applies internally, the change in the model prediction on this example implies that effectively the model made a change as if it had seen n similar examples.

The value of n gives us information which is even more interesting than uncertainty variance, because it is independent of the actual label probability p (or in this case $p_t$). To give a variance estimate we can simply use the Bernoulli variance equation in (1) plugging in n from equation (3). Thus the uncertainty score (which accounts for the actual prediction) is given by $$\sigma^2 \approx \frac{p_t(1 - p_t)}{n} = (1 - p_t)p_t^2|\delta| \quad (4)$$

Note that for using precise FTRL bounds we may need to offset n by 1, but that has very little effect here.

While in the single dimensional case, there may be no difference which label is picked to generate equations (3) and (4), in a practical model, the values that may be produced after updating all features/parameters in the model may result in delta values that give different values of n for the different labels. We can use a weighted average to generate a single score, or emphasize on the label that is more or less likely to occur to generate more conservative scores (for the more likely label, gradients are smaller, and thus delta may be smaller. For less likely labels, delta may be larger, potentially generating larger uncertainty scores. In either case, the deviation may depend on the internals of the model.) Alternatively, we can consistently generate the score on the same label value.

In some implementations, the model used to compute the uncertainty score can be an auxiliary model to a model that is used to perform inference in a deployed system. For example, the auxiliary model can have similar features or parameter values but can be substantially simpler (e.g., smaller in terms of parameter values, reduced latency, etc.).

In some implementations, the computed uncertainty score of effective number of similar examples can be used to determine the shrinkage of the model prediction. For example, shrinkage can refere to the reduction of logit score based on uncertainty. Shrinkage can be performed to effectively regularize the model's prediction more with larger uncertainty, or less with smaller uncertainty.

With reference now to the Figures, example embodiments of the present disclosure will be discussed in further detail.

Example Methods

FIG. 1 depicts a flow chart diagram of an example method to determine an uncertainty score for a machine-learned model according to example embodiments of the present disclosure. The various steps of the method shown in FIG. 1 can be omitted, rearranged, combined, and/or adapted in various ways without deviating from the scope of the present disclosure.

At 12, a computing system can access a next example in a set of examples. Each example in the set of examples can include an input and a label. The label may be the true "ground truth" label or may be an incorrect label. The label may be a binary label or a label from a multi-label setting. In some implementations, a given input is contained in only one example. In other implementations, a given input may be included in multiple examples. In some implementations, each input is included in a plurality of examples which correspond to all potential labels.

At 14, the computing system can process the input with the machine-learned model to generate a model score and a prediction with respect to the label. In some implementations, the model score comprises a dot product or an output of a neural network. For example, the model score can be a logit score. In some implementations, the prediction comprises a probability prediction for the input relative to the label. In some implementations, a prediction score can be converted to a logit score via a loss function, and the logit score can be used with the proposed method.

At 16, the computing system can update one or more parameter values of the machine-learned model based on a gradient associated with the prediction of the machine-learned model with respect to the label, thereby generating an updated machine-learned model. For example, updating the one or more parameter values of the machine-learned model based on the gradient can include performing a gradient descent step in a gradient descent technique (e.g., via backpropagation of a gradient of a loss function that evaluates the prediction).

At 18, the computing system can process the input with the updated machine-learned model to generate an updated score.

At 20, the computing system can determine a difference between the model score and the updated score.

At 22, the computing system can determine one or both of the following: A measure of an effective number of similar examples that the machine-learned model observed in a training dataset based on the difference between the model score and the updated score; and/or an uncertainty score for the example based on the difference between the model score and the updated score.

In some implementations, the measure of the effective number of similar examples comprises one divided by the prediction times an absolute value of the difference between the model score and the updated score. For example, the measure can be determined according to the following expression:

$$n = \frac{1}{|\delta| p_t} \quad (3)$$

where n represents the effective number of similar examples, $|\delta|$ is the absolute value of the difference between the model score and the updated score, and $p_t$ is the prediction.

In some implementations, the uncertainty score comprises one minus the prediction times the prediction squared times an absolute value of the difference between the model score and the updated score. For example, the uncertainty score can be determined according to the following expression:

$$\sigma^2 \approx \frac{p_t(1-p_t)}{n} = (1-p_t)p_t^2|\delta| \quad (4)$$

where $\sigma^2$ represents the uncertain score, $p_t$ is the prediction, and $|\delta|$ is the absolute value of the difference between the model score and the updated score.

Referring again to FIG. 1, at 24, the computing system can revert the updates to the machine-learned model. For example, at 24 the computing system can revert the updating of the one or more parameter values of the machine-learned model performed at 16, so as to return to the machine-learned model prior to said updating.

At 26, the computing system can determine whether additional examples remain in the set of examples. If yes, the method can return to 12. If no, the method can proceed to 28.

At 28, the computing system can determine an action based on the measure or the uncertainty score determined for each of the plurality of examples. As one example, the action can be an explore or exploit decision.

In some implementations, the method includes determining the measure or the uncertainty score for the input relative to each of a number of possible labels and generating a weighted average of the measures or the uncertainty scores over all of the number of possible labels.

The proposed method can be applied on a complete model that is used for full inference. However, in some implementations, an auxiliary model with similar features to the main inference model, but substantially simpler, can be used to generate the effective n or the uncertainty score. As long as the same model is used for generating uncertainty scores for all examples, and that model contains the features affecting the prediction uncertainties, substantial complexity savings can be achieved by using a simplified model for generating the uncertainty scores. In some implementations, the scores are used only for determining the uncertainty ranking among examples, not an absolute uncertainty measurement, and as such, simpler auxiliary tasks can be used to generate these scores.

Example Devices and Systems

Figure 2A:
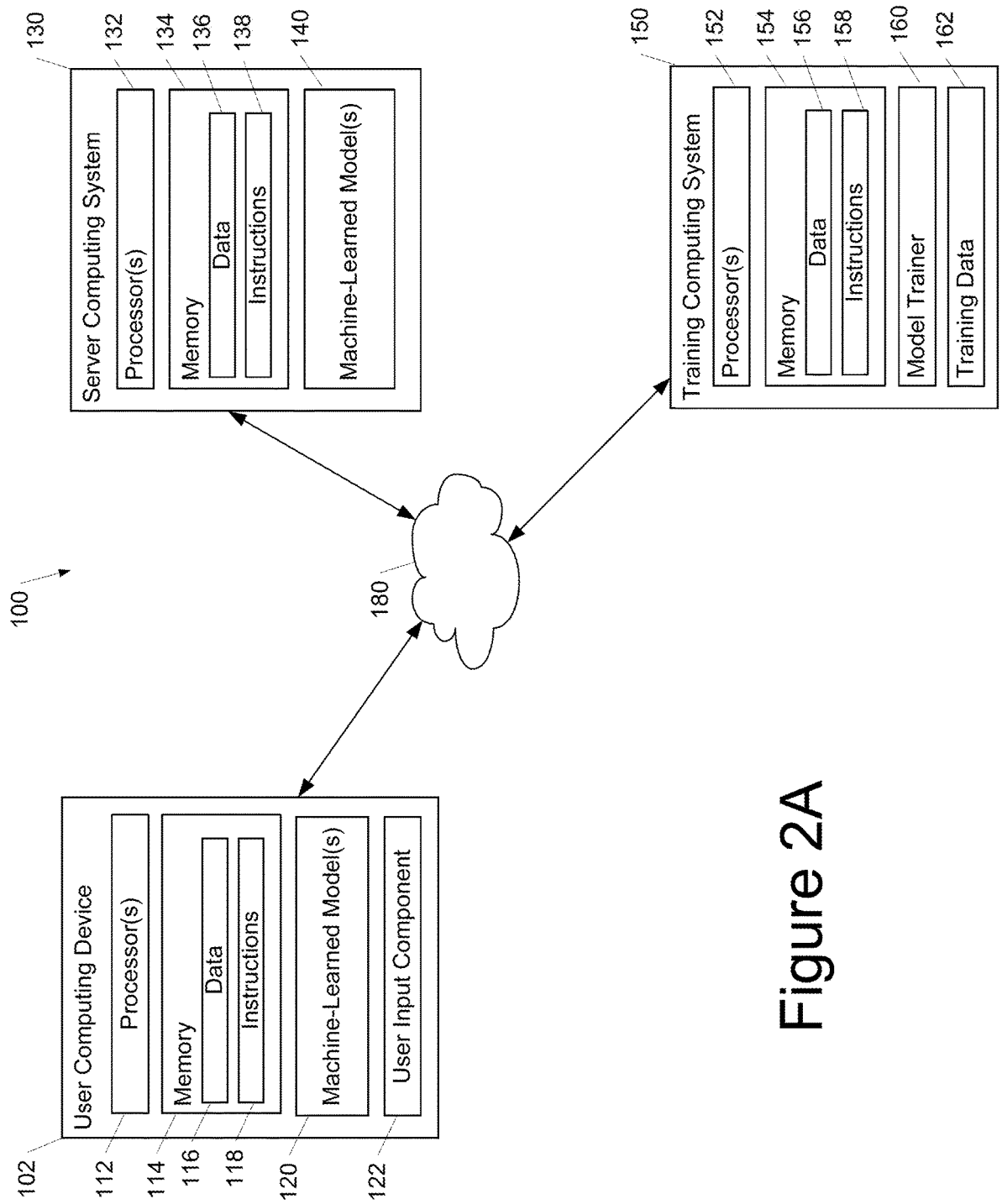
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130. Any of the user computing device 102, the server computing system 130, and/or the training computing system 150 can store and/or execute computer-readable instructions for performing the method shown in FIG. 1.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 2A illustrates one example computing system that can be used to implement the present disclosure. Other computing systems can be used as well. For example, in some implementations, the user computing device 102 can include the model trainer 160 and the training dataset 162.

In such implementations, the models 120 can be both trained and used locally at the user computing device 102. In some of such implementations, the user computing device 102 can implement the model trainer 160 to personalize the models 120 based on user-specific data.

Figure 2B:
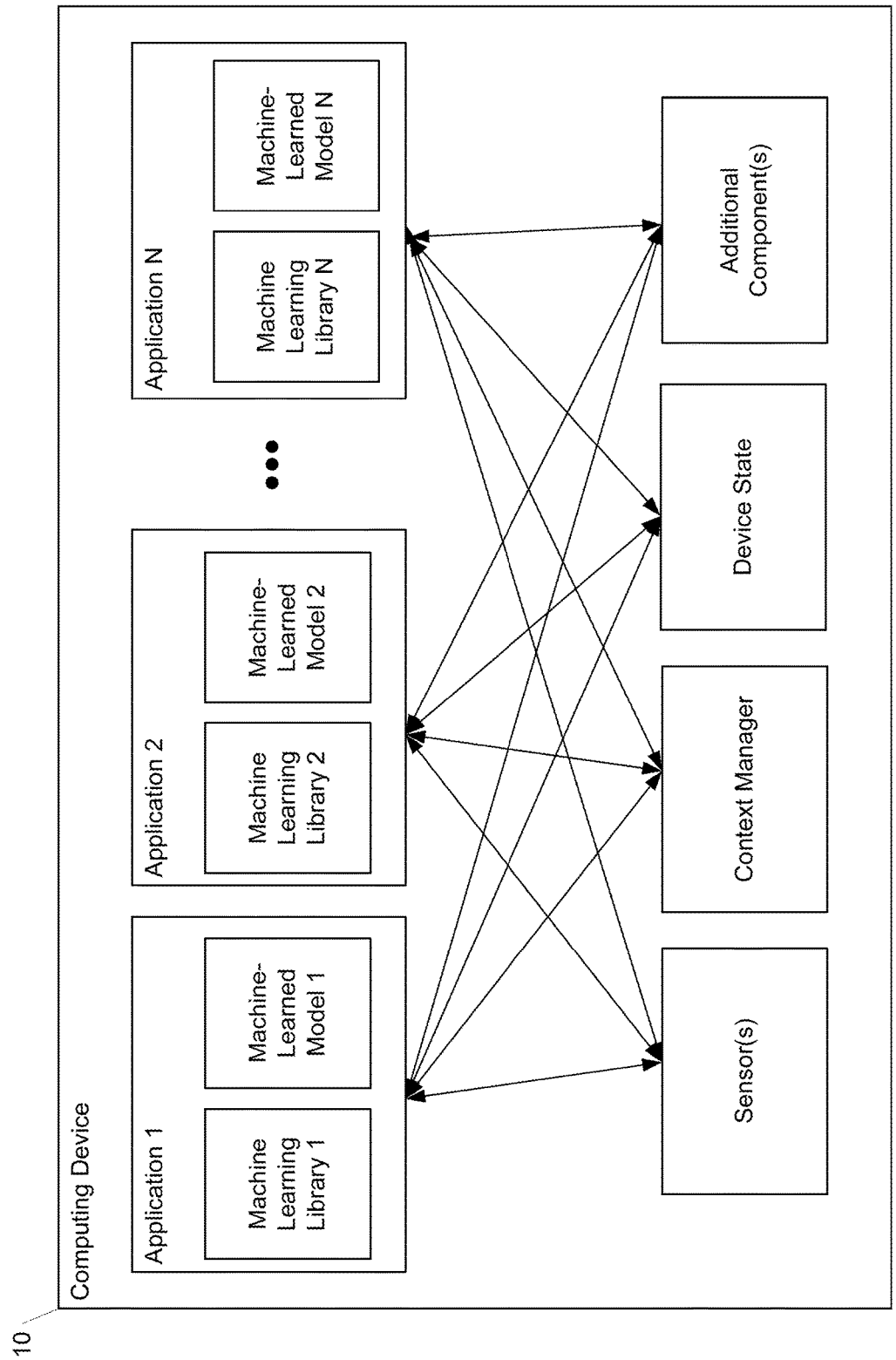
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
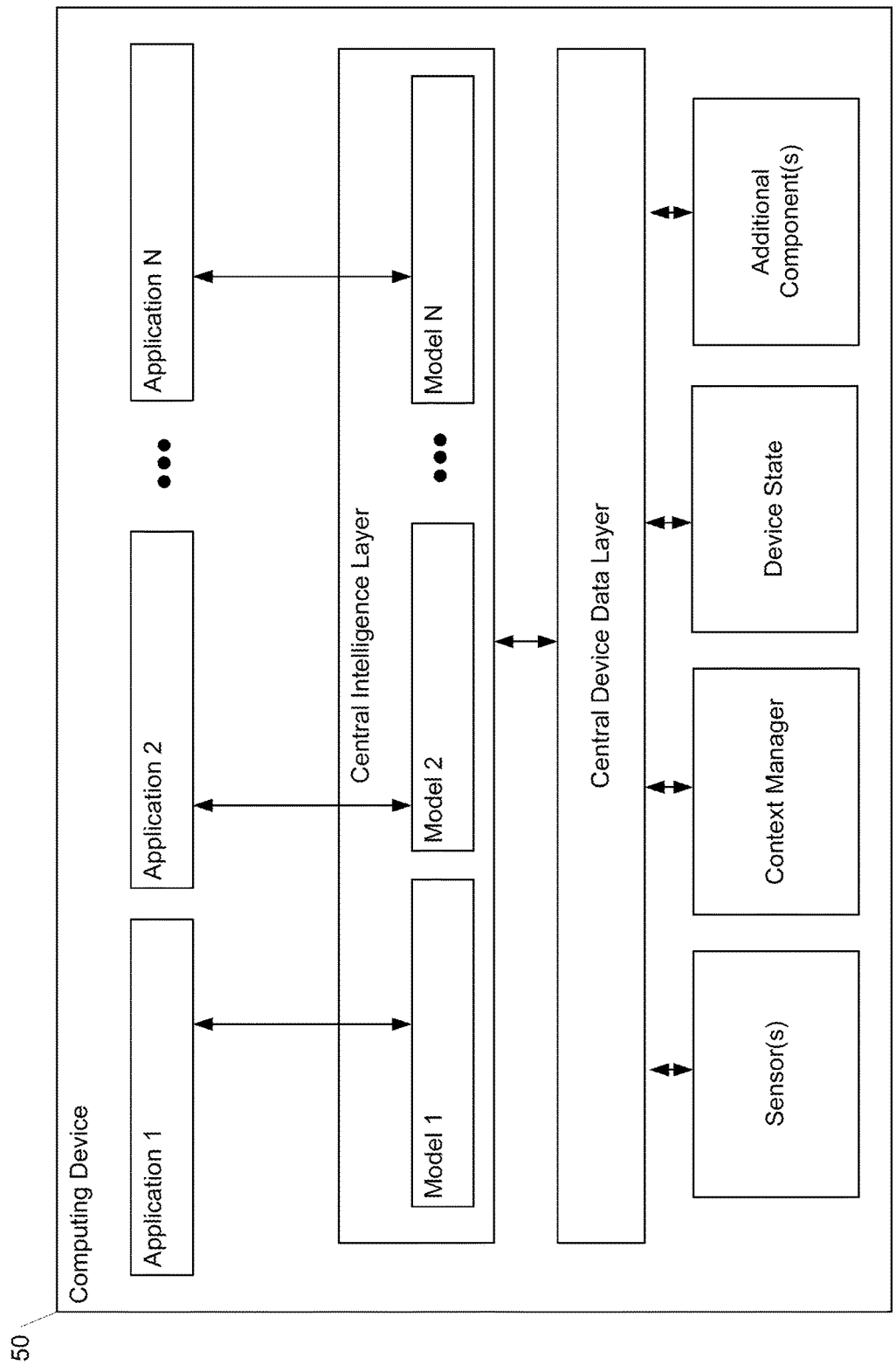
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   for each of a plurality of examples, each example comprising an input and a label:
      processing, by a computing system comprising one or more computing devices, the input with the machine-learned model to generate a model score and a prediction with respect to the label;
      updating, by the computing system, one or more parameter values of the machine-learned model based on a gradient associated with the prediction of the machine-learned model with respect to the label, thereby generating an updated machine-learned model;
      processing, by the computing system, the input with the updated machine-learned model to generate an updated score;
      determining, by the computing system, a difference between the model score and the updated score; and
      determining, by the computing system, a measure of an effective number of similar examples that the machine-learned model observed in a training dataset based on the difference between the model score and the updated score;
      determining, by the computing system, an uncertainty score for the input relative to each of a number of possible labels; and
      generating, by the computing system, a weighted average of the uncertainty score over all of the number of possible labels and
   initiating, by the computing system, an action based on the measure determined for each of the plurality of examples.

2. The computer-implemented method of claim 1, wherein the action comprises an explore or exploit decision.

3. The computer implemented method of claim 1, wherein the model used to compute the measure is an auxiliary model to a model used to perform inference.

4. The computer-implemented method of claim 1, wherein the measure of the effective number of similar examples is used to determine a shrinkage of the prediction.

5. The computer-implemented method of claim 1, wherein the label for each example comprises a ground truth label for the input.

6. The computer-implemented method of claim 1, wherein the label for each example comprises a binary label.

7. The computer-implemented method of claim 1, wherein the label for each example comprises a label from a multi-label setting.

8. The computer-implemented method of claim 1, wherein the model score comprises a dot product or an output of a neural network.

9. The computer-implemented method of claim 1, wherein the model score comprises a logit score.

10. The computer-implemented method of claim 1, wherein the prediction comprises a probability prediction for the input relative to the label.

11. The computer-implemented method of claim 1, wherein the measure comprises one divided by the prediction times an absolute value of the difference between the model score and the updated score.

12. The computer-implemented method of claim 1, wherein updating, by the computing system, the one or more parameter values of the machine-learned model based on the gradient comprises performing a gradient descent step.

13. The computer-implemented method of claim 1, further comprising, for each example: reverting the updating of the one or more parameter values of the machine-learned model so as to return to the machine-learned model prior to said updating to perform inference on the score of the ground truth label of an example.

14. The computer-implemented method of claim 1, wherein the machine-learned model is updated in an online fashion.

15. A computer system configured to perform operations, the operations comprising:
   for at least one of a plurality of examples, each example comprising an input and a label:
      processing, by a computing system comprising one or more computing devices, the input with the machine-learned model to generate a model score and a prediction with respect to the label;
      updating, by the computing system, one or more parameter values of the machine-learned model based on a gradient associated with the prediction of the machine-learned model with respect to the label, thereby generating an updated machine-learned model;
      processing, by the computing system, the input with the updated machine-learned model to generate an updated score;
      determining, by the computing system, a difference between the model score and the updated score; and
      determining, by the computing system, an uncertainty score for the example based on the difference between the model score and the updated score;
      determining, by the computing system, the uncertainty score for the input relative to each of a number of possible labels; and
      generating, by the computing system, a weighted average of the uncertainty scores over all of the number of possible labels; and
   initiating, by the computing system, an action based on the uncertainty score for the at least one of plurality of examples.

16. One or more non-transitory computer-readable media that store instructions that, when executed by one or more processors of a computing system, cause the computing system to perform operations, the operations comprising:

for each of a plurality of examples, each example comprising an input and a label:

processing, by a computing system comprising one or more computing devices, the input with the machine-learned model to generate a model score and a prediction with respect to the label;

updating, by the computing system, one or more parameter values of the machine-learned model based on a gradient associated with the prediction of the machine-learned model with respect to the label, thereby generating an updated machine-learned model;

processing, by the computing system, the input with the updated machine-learned model to generate an updated score;

determining, by the computing system, a difference between the model score and the updated score; and determining, by the computing system, an uncertainty score for the example based on the difference between the model score and the updated score;

determining, by the computing system, the uncertainty score for the input relative to each of a number of possible labels; and generating, by the computing system, a weighted average of the uncertainty scores over all of the number of possible labels; and initiating, by the computing system, an action based on the uncertainty score determined for each of the plurality of examples.

17. The one or more non-transitory computer-readable media of claim 16, wherein the uncertainty score comprises one minus the prediction times the prediction squared times an absolute value of the difference between the model score and the updated score.

18. The one or more non-transitory computer-readable media of claim 16, wherein the action comprises an explore or exploit decision.

* * * * *